United States Patent
Avery

(10) Patent No.: US 10,280,962 B2
(45) Date of Patent: May 7, 2019

(54) INSERT FOR JOINING COMPONENTS

(71) Applicant: Ford Global Technologies, LLC, Dearborn, MI (US)

(72) Inventor: Katherine Avery, Saline, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 302 days.

(21) Appl. No.: 15/422,665

(22) Filed: Feb. 2, 2017

(65) Prior Publication Data

US 2018/0216649 A1    Aug. 2, 2018

(51) Int. Cl.
| F16B 19/04 | (2006.01) |
| B32B 3/28 | (2006.01) |
| B32B 7/08 | (2019.01) |
| F16B 5/04 | (2006.01) |
| F16B 19/06 | (2006.01) |

(52) U.S. Cl.
CPC ............ *F16B 19/04* (2013.01); *B32B 3/28* (2013.01); *B32B 7/08* (2013.01); *F16B 5/04* (2013.01); *F16B 19/06* (2013.01); *B32B 2250/02* (2013.01); *B32B 2307/752* (2013.01)

(58) Field of Classification Search
CPC .......... F16B 5/04; F16B 5/0208; F16B 19/04; F16B 19/06; F16B 21/18; F16B 43/00; B32B 3/28; B32B 7/08
USPC ................. 411/353, 517, 531, 546, 908, 918
See application file for complete search history.

(56) References Cited

U.S. PATENT DOCUMENTS

| 2,943,373 | A | * | 7/1960 | Rapata | F16B 21/075 24/662 |
| 3,619,478 | A | * | 11/1971 | Staiger | H05K 3/326 174/267 |
| 4,285,380 | A | * | 8/1981 | Gulistan | F16B 5/0208 411/103 |
| 4,545,837 | A | * | 10/1985 | Wehnert | B29C 70/347 156/191 |
| 4,659,268 | A | * | 4/1987 | Del Mundo | F16B 19/04 411/34 |
| 4,840,522 | A | * | 6/1989 | Kurihara | F16B 19/1081 411/44 |
| 7,273,532 | B2 | * | 9/2007 | Eckelt | B32B 17/10045 156/293 |

(Continued)

FOREIGN PATENT DOCUMENTS

| DE | 102009017776 A1 | 10/2010 |
| FR | 2974867 | 9/2012 |

*Primary Examiner* — Roberta S Delisle
(74) *Attorney, Agent, or Firm* — Vichit Chea; Bejin Bieneman PLC

(57) ABSTRACT

A joined structure includes a first component, a second component, and an insert. The first component is formed of a fiber-reinforced material and has a hole defining an axis. The second component is adjacent the first component and has a hole aligned with the hole of the first component. The insert is positioned in the hole of the first component. The insert includes an inner layer having a tubular shape about the axis, a middle layer concentrically adjacent to the inner layer about the axis, and an outer layer concentrically adjacent to the middle layer about the axis. The layers are formed of fiber-reinforced materials. One of a boundary between the inner and middle layers and a boundary between the middle and outer layers has a nonlinear profile in a direction parallel to the axis.

20 Claims, 5 Drawing Sheets

(56) References Cited

U.S. PATENT DOCUMENTS

| | | | |
|---|---|---|---|
| 7,897,241 B2 * | 3/2011 | Rice | C08J 5/044 |
| | | | 16/2.1 |
| 8,393,068 B2 * | 3/2013 | Keener | F16B 19/06 |
| | | | 29/525.01 |
| 8,739,388 B2 | 6/2014 | Campbell et al. | |
| 9,327,446 B2 | 5/2016 | Clark et al. | |
| 2005/0163592 A1 * | 7/2005 | Junkers | B25B 1/00 |
| | | | 411/303 |
| 2015/0260208 A1 | 9/2015 | Baker et al. | |

* cited by examiner

INSERT FOR JOINING COMPONENTS

BACKGROUND

Motor vehicles and other complex assemblies may include components made of fiber-reinforced plastic and components made of metal. Fiber-reinforced plastic is a composite material, that is, a material made of two or more materials with significantly different physical or chemical properties. Fiber-reinforced plastic is made of a polymer matrix reinforced with fibers. A fiber is elongated, i.e., has a length much longer than its thickness. Among other applications, fiber-reinforced plastic may be used in body panels, particularly in vehicles.

Metals such as steel and aluminum are used extensively in vehicles, for example, in the frame, body panels, engine, drivetrain, etc.

DETAILED DESCRIPTION

Figure 1:
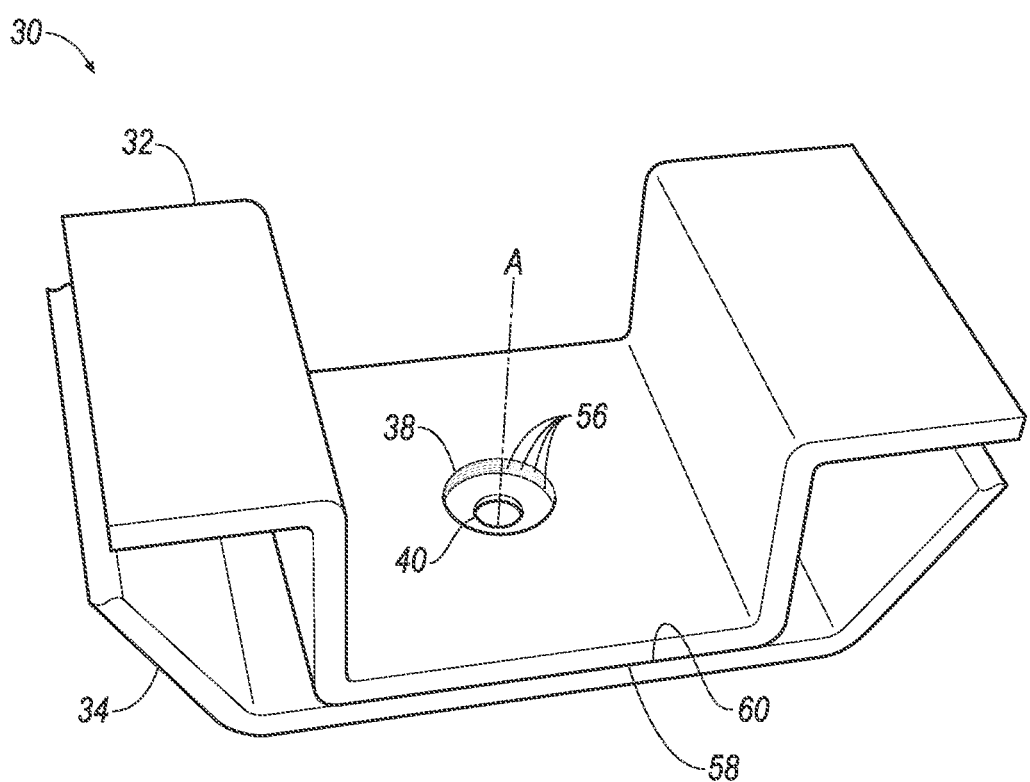
FIG. 1 is a perspective view of a first component and a second component.

With reference to the Figures, wherein like numerals indicate like parts throughout the several views, a joined structure 30 includes a first component 32, a second component 34, and an insert 36. (The adjectives "first" and "second" are used throughout this document as identifiers and are not intended to signify importance or order.) The first component 32 is formed of a fiber-reinforced material and has a hole 38 defining an axis A. The second component 34 is adjacent the first component 32 and has a hole 40 aligned with the hole 38 of the first component 32. The insert 36 is positioned in the hole 38 of the first component 32. The insert 36 includes an inner layer 42 having a tubular shape about the axis A, a middle layer 44 concentrically adjacent to the inner layer 42 about the axis A, and an outer layer 46 concentrically adjacent to the middle layer 44 about the axis A. The layers 42, 44, 46 are formed of fiber-reinforced materials. One of a boundary 50 between the inner and middle layers 42, 44 and a boundary 52 between the middle and outer layers 44, 46 has a nonlinear profile in a direction parallel to the axis A.

The insert 36 allows the first component 32, which is made of fiber-reinforced material, to be joined to the second component 34 with a reduced risk of corrosion. The second component 34 or a fastener 48 joining the first and second components 32, 34 may be formed of metal. When fibers in a fiber-reinforced material are exposed to metal, the fibers can cause galvanic corrosion in the metal, which may compromise the strength of the joint, e.g., the fastener 48. The insert 36 reduces the exposure of fibers in the fiber-reinforced material to parts made of metal, e.g., reduces exposure of fibers 56 of the first component 32 to the metal of the fastener 48 and/or the second component 34. The insert 36 may also provide additional energy absorption when the first and second components 32, 34 are subjected to opposing forces, reducing a risk that the joined structure 30 fails, i.e., separates.

With reference to FIGS. 1-4, the first component 32 may have a sheet-like or panel-like shape, that is, a length and width much greater than a thickness. The sheet-like shape of the first component 32 may be curved or bent or molded according to the purpose of the first component 32. As one example, the first component 32 may be a body panel of a vehicle (not shown), e.g., a passenger or commercial automobile such as a car, truck, van, sports-utility vehicle, station wagon, etc. Specifically, the first component 32 may be an exterior body panel of the vehicle. The first component 32 may have a class-A surface, i.e., a surface intended to be exposed to a customer and specifically manufactured to have a high-quality, finished aesthetic appearance free of blemishes. As other examples, the first component 32 may be a structural member of the vehicle, e.g., a body reinforcement, frame member, pillar, roof beam, roof rail, rocker, frame cross-member, etc.

The first component 32 is formed of a fiber-reinforced material; in other words, the first component 32 is fiber-reinforced material. The fiber-reinforced material of the first component 32 may be, e.g., fiber-reinforced plastic or fiber-reinforced polymer. The fiber-reinforced material includes fibers 56. The fibers 56 may be formed of, e.g., carbon, aramid, glass, polyacrylonitrile, rayon, etc. The fiber-reinforced material includes a matrix material, and the fibers 56 are set in the matrix material. The matrix material of the first component 32 may be, for example, polyester, epoxy, polyamide, polycarbonate, polypropylene, vinyl, any suitable type of polymer, etc.

Figure 4:
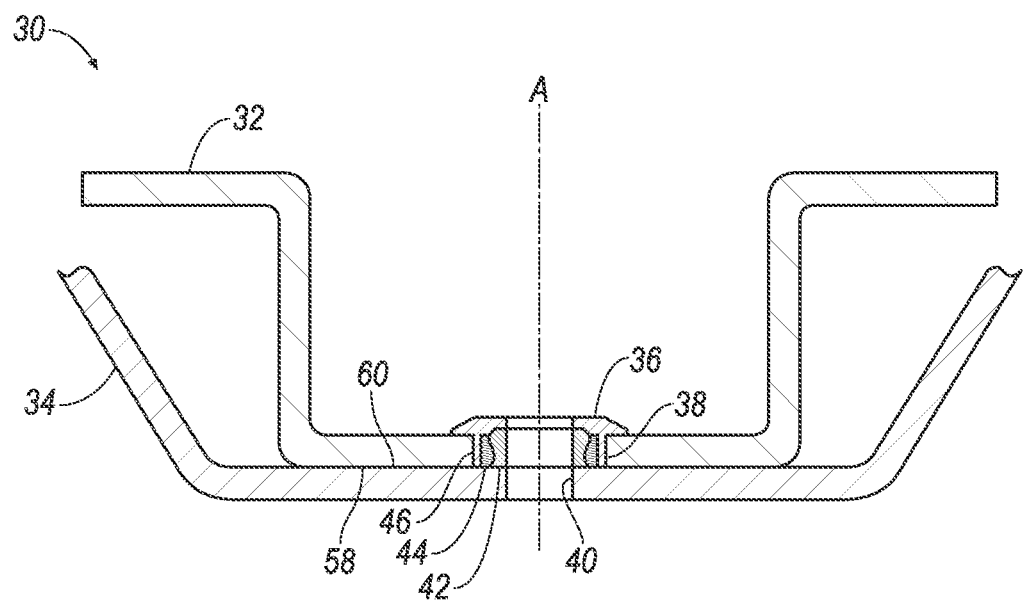
FIG. 4 is a cross-sectional view of the first component, the second component, and the insert along line 3-3 in FIG. 2, with the fastener removed for illustration.

With reference to FIGS. 1 and 4, the first component 32 has the hole 38. The hole 38 may be cut through the thickness of the first component 32. For example, the hole 38 may be cut after formation of the first component 32, which leads to exposed ends of the fibers 56 around the hole 38. At least some of the fibers 56 of the first component 32 may be exposed in the hole 38; that is, at least some of the fibers 56 are located at a surface of the hole 38 rather than being covered by, e.g., the matrix material. Thus, the fibers 56 may be at risk of causing corrosion in metal parts touching the fibers 56, if any.

With reference to FIGS. 1-4, the joined structure 30 includes the second component 34. The second component 34 may have a sheet-like or panel-like shape, that is, a length and width much greater than a thickness. The sheet-like shape of the first component 32 may be curved or bent or molded according to the purpose of the first component 32. For example, the first component 32 may be a body panel in a vehicle (not shown). As other examples, the second component 34 may be a structural member of the vehicle, e.g., a body reinforcement, frame member, pillar, roof beam, roof rail, rocker, frame cross-member, etc.

The second component 34 is adjacent the first component 32; that is, nothing is between the first component 32 and the second component 34, and the second component 34 may be touching the first component 32. The second component 34 may be flush against the first component 32. More specifically, a region 58 surrounding the hole 38 of the first component 32 may be touching a region 60 surrounding the hole 40 of the second component 34. The regions 58, 60 may represent broad surfaces of the first and second components 32, 34 that are orthogonal to the thicknesses of the first and second components 32, 34.

The second component 34 may be formed of any suitably strong and durable material for its purpose; in other words, the second component 34 is such a material. For example, the second component 34 may be formed of a metal such as steel or aluminum, a plastic, a fiber-reinforced material such as described for the first component 32, etc.

With reference to FIGS. 1 and 4, the second component 34 has the hole 40 aligned with the hole 38 of the first component 32. For example, the axis A defined by the hole 38 of the first component 32 may be the same as an axis defined by the hole 40 of the second component 34. The direction of the holes 38, 40 may be parallel.

Figure 2:
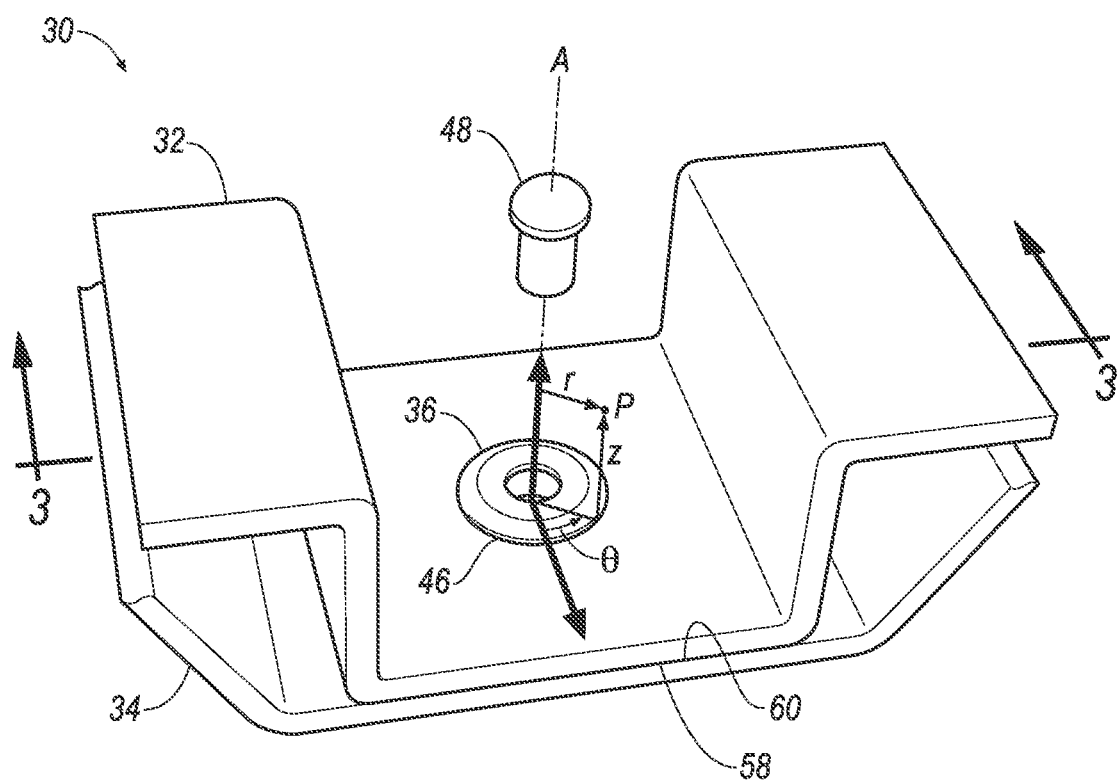
FIG. 2 is a perspective view of the first component, the second component, an insert, and a fastener.

With reference to FIG. 2, the hole 38 of the first component 32 defines the axis A. This axis A may be the basis of a cylindrical coordinate system. In the cylindrical coordinate system, a position P is specified in three dimensions: an axial dimension z parallel to the axis A, a radial dimension r directed perpendicularly away from the axis A, and a circumferential dimension θ about the axis A. The axial dimension z and the radial dimension r are distances, and the circumferential dimension is an angle. An axial direction is a direction parallel to the axis A, that is, the axial dimension z increases or decreases while the radial dimension r and circumferential dimension θ are constant. A radial direction is a direction orthogonally toward or away from the axis A, that is, the radial dimension r increases or decreases while the axial dimension z and circumferential dimension θ are constant. A circumferential direction is orbiting the axis A in a plane orthogonal to the axis A, that is, the circumferential dimension θ increases or decreases while the axial dimension z and the radial dimension r are constant.

With reference to FIG. 4, the insert 36 is positioned in the hole 38 of the first component 32. The insert 36 may be positioned outside the hole 40 of the second component 34, as shown in FIG. 4, or the insert 36 may extend into the hole 40 of the second component 34. The insert 36 may have a cylindrical shape aligned with the axis A.

Figure 5:
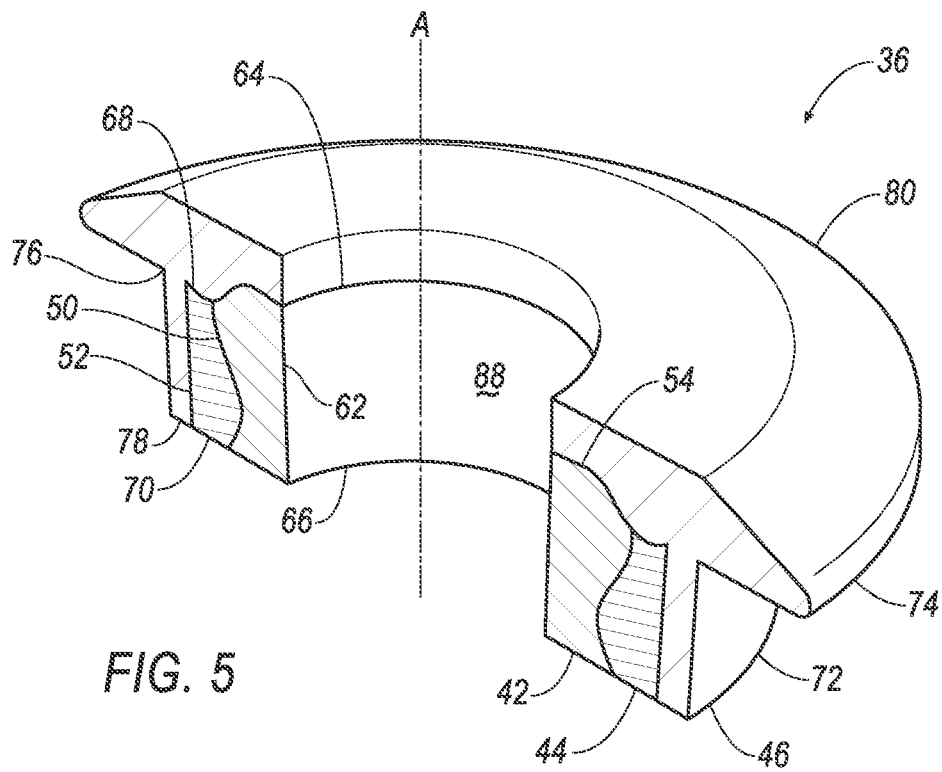
FIG. 5 is a cutaway view of the insert along line 3-3 in FIG. 2.
Figure 6:
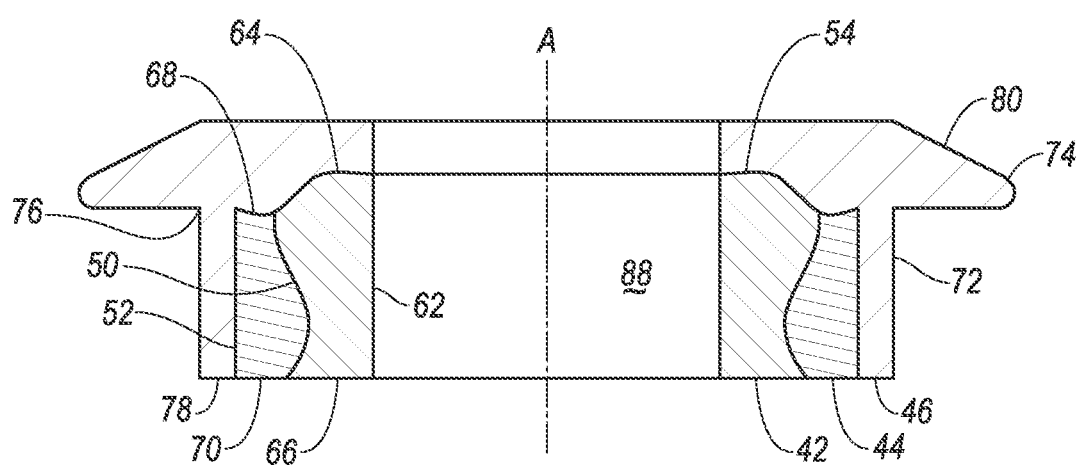
FIG. 6 is a cross-sectional view of the insert along line 3-3 in FIG. 2.

With reference to FIGS. 4-6, the insert 36 includes the inner layer 42 having a tubular shape about the axis A. In other words, the inner layer 42 may have a round shape elongated along the axis A and may have a bore 62 extending through the inner layer 42 parallel to or aligned with the axis A. The inner layer 42 may extend axially from a first end 64 to a second end 66. The second end 66 may be touching the second component 34, and the first end 64 may be spaced from the second component 34 and may be positioned at an end of the hole 38 of the first component 32 opposite the second component 34.

The middle layer 44 is concentrically adjacent to the inner layer 42 about the axis A; i.e., the middle layer 44 is adjacent to the inner layer 42 around the entirety of a circumference of the axis A. The middle layer 44 may have a tubular shape. The middle layer 44 may have a round shape elongated along the axis A and may circumferentially surround the inner layer 42 about the axis A. The middle layer 44 may extend axially from a first end 68 to a second end 70. The middle layer 44 may be axially coextensive with the inner layer 42; that is, the first end 68 of the middle layer 44 may be at the first end 64 of the inner layer 42, and the second end 70 of the middle layer 44 may be at the second end 66 of the inner layer 42. The middle layer 44 may extend from the first end 64 of the inner layer 42 to the second end 66 of the inner layer 42. The second end 70 of the middle layer 44 may touch the second component 34, and the middle layer 44 may extend axially away from the second end 70 to the first end 68 of the middle layer 44.

The middle layer 44 and the inner layer 42 may have the boundary 50 between them. The boundary 50 may be a shared surface of the inner layer 42 and the middle layer 44. The boundary 50 may have a nonlinear profile in a direction parallel to the axis A, that is, along the axial dimension. In other words, the boundary 50 does not follow a straight line between the first end 64 of the inner layer 42 and the second end 66 of the inner layer 42. The shape of the boundary 50 may be a surface of revolution, that is, a surface formed by revolving a curve in a plane around a straight line in the plane. The boundary 50 may be a surface of revolution of the nonlinear profile revolved around the axis A.

With continued reference to FIGS. 4-6, the outer layer 46 may include a tubular portion 72 and a flange portion 74. The tubular portion 72 is concentrically adjacent to the middle layer 44 about the axis A; i.e., the tubular portion 72 is adjacent to the middle layer 44 around the entirety of a circumference of the axis A. The tubular portion 72 has a tubular shape. The tubular portion 72 may have a round shape elongated along the axis A and may circumferentially surround the middle layer 44 about the axis A. The tubular portion 72 may extend axially from a first end 76 to a second end 78. The first end 76 of the tubular portion 72 may connect to the flange portion 74. The tubular portion 72 may be axially coextensive with the middle layer 44 and/or the inner layer 42; that is, the first end 76 of the tubular portion 72 may be at the first end 64, 68 of the middle layer 44 and/or the inner layer 42, and the second end 78 of the tubular portion 72 may be at the second end 66, 70 of the middle layer 44 and/or the inner layer 42. The tubular portion 72 may extend from the first end 64, 68 of the middle layer 44 and/or the inner layer 42 to the second end 66, 70 of the middle layer 44 and/or the inner layer 42. The second end 78 of the tubular portion 72 may touch the second component 34, and the tubular potion may extend axially away from the second end 78 to the first end 76 of the tubular portion 72.

The middle layer 44 and the tubular portion 72 of the outer layer 46 may have the boundary 52 between them. The boundary 52 may be a shared surface of the middle layer 44 and the outer layer 46. The boundary 52 may have a nonlinear profile in a direction parallel to the axis A, that is, along the axial dimension. In other words, the boundary 52 does not follow a straight line along the axial dimension between the first end 68 of the middle layer 44 and the second end 70 of the middle layer 44. The shape of the boundary 52 may be a surface of revolution, that is, a surface formed by revolving a curve in a plane around a straight line in the plane. The boundary 52 may be a surface of revolution of the nonlinear profile revolved around the axis A.

With continued reference to FIGS. 4-6, the flange portion 74 of the outer layer 46 may extend radially outward relative to the axis A from the tubular portion 72, that is, may extend in a radial direction away from the axis A. The flange portion 74 may have an outer diameter greater than an outer diameter of the tubular portion 72 of the outer layer 46. The flange portion 74 may have a bevel 80 extending circumferentially at the outer diameter of the flange portion 74.

The flange portion 74 may extend radially inward relative to the axis A from the tubular portion 72 adjacent the first end 64 of the inner layer 42, that is, may extend in a radial direction toward the axis A. The flange portion 74 may be adjacent the middle layer 44. The flange portion 74 may have an inner diameter smaller than an inner diameter of the tubular portion 72. The flange portion 74 may have the inner diameter the same size as an inner diameter of the inner layer 42, that is, the same size as a diameter of the bore 62 of the inner layer 42.

The flange portion 74 of the outer layer 46 has a boundary 54 with the first end 64 of the inner layer 42 and the first end 68 of the middle layer 44. The boundary 54 may be shared surface of flange portion 74 and the inner layer 42 or the middle layer 44. The boundary 54 may have a nonlinear profile in a direction orthogonal to the axis A, that is, along the radial dimension. In other words, the boundary 54 does not follow a straight line along the radial dimension from the inner diameter of the flange or the inner layer 42 at the first end 64 to the inner diameter of the tubular portion 72 at the first end 76. The shape of the boundary 54 may be a surface of revolution, that is, a surface formed by revolving a curve in a plane around a straight line in the plane. The boundary 54 may be a surface of revolution of the nonlinear profile revolved around the axis A.

Figure 7:
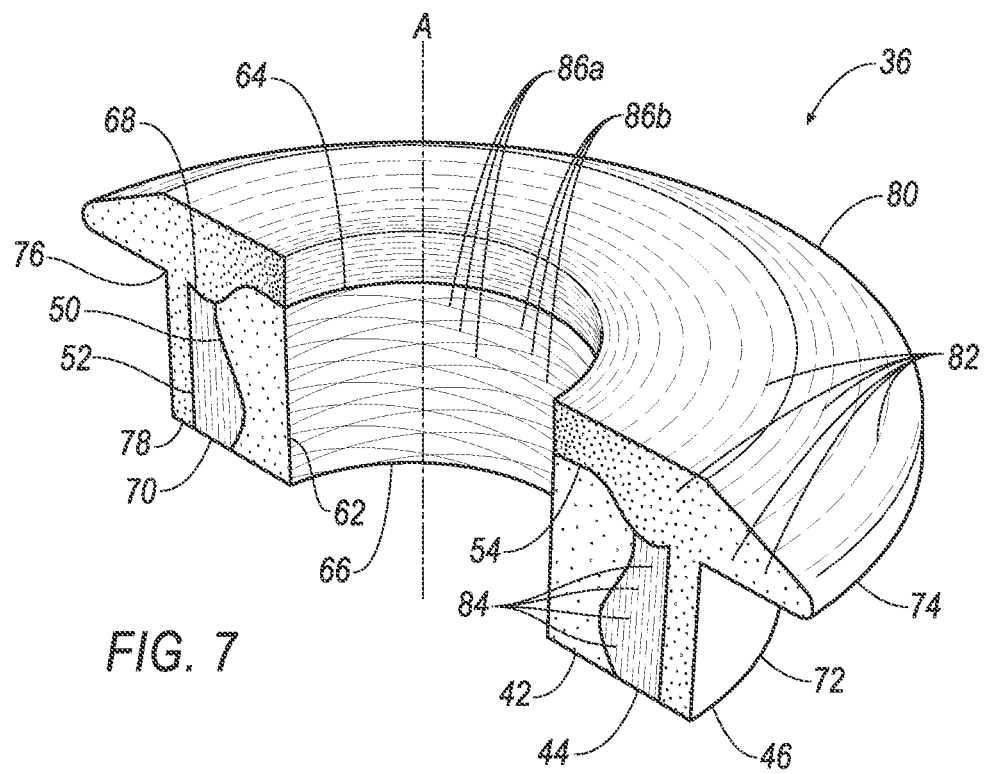
FIG. 7 is a cutaway view of a first embodiment of the insert.
Figure 8:
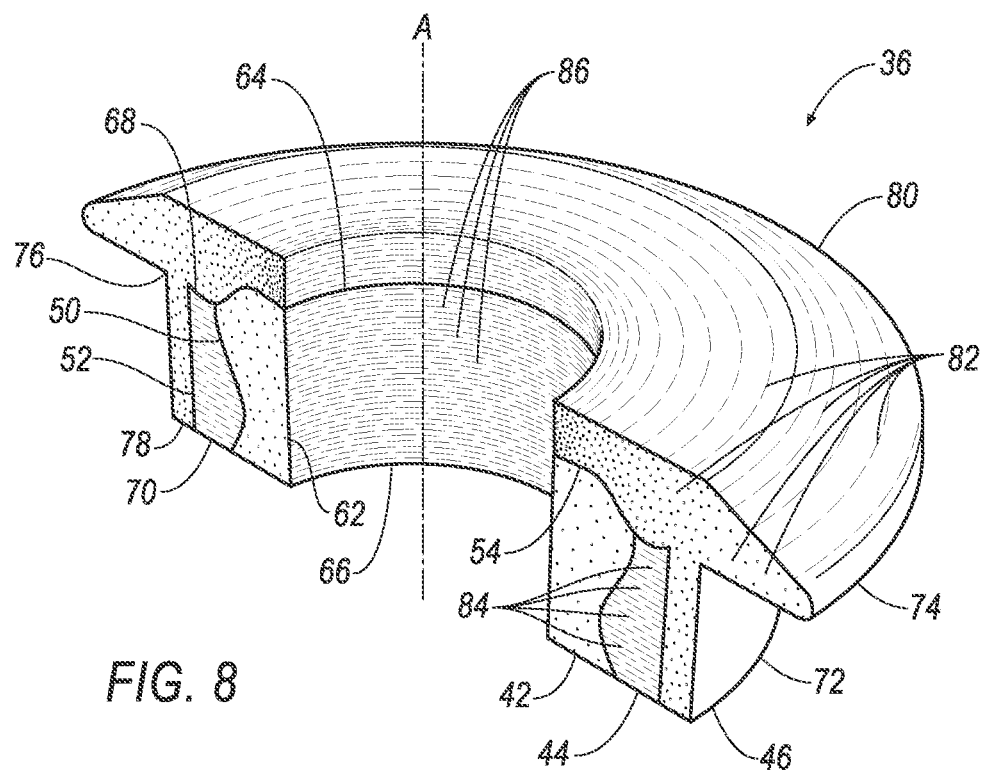
FIG. 8 is a cutaway view of a second embodiment of the insert.

With reference to FIGS. 7 and 8, the layers 42, 44, 46 are formed of fiber-reinforced materials; that is, the layers 42, 44, 46 are fiber-reinforced material. The layers 42, 44, 46 may be formed of the same or different fiber-reinforced materials, or two of the three layers 42, 44, 46 may be formed of the same fiber-reinforced material, i.e., the same type of fiber-reinforced material. As another example, all three layers 42, 44, 46 may be formed of different fiber-reinforced material, i.e., a different type of fiber-reinforced material. As set forth above, the fiber-reinforced materials may be, e.g., fiber-reinforced plastic or fiber-reinforced polymer such as carbon fiber, glass fiber, or aramid fiber. The fiber-reinforced materials each have fibers 82, 84, 86. The fibers 82, 84, 86 may be formed of, e.g., carbon, aramid, glass, polyacrylonitrile, rayon, etc. The fiber-reinforced materials each include a matrix material, and the fibers 82, 84, 86 are be set in the matrix materials. The matrix materials of the layers 42, 44, 46 may be, for example, polyester, epoxy, polyamide, polycarbonate, polypropylene, vinyl, any suitable type of polymer, etc.

The layers 42, 44, 46 may be integral, i.e., formed together simultaneously as a one-piece unit. Alternatively, any one of the layers 42, 44, 46 may be formed separately from the others and subsequently fixed to the others.

The fibers 84 of the fiber-reinforced material of the middle layer 44 extend in a direction relative to the axis A different than the fibers 82, 86 of the fiber-reinforced material of one of the inner layer 42 and the outer layer 46. For example, if the fibers 84 of the middle layer 44 extend radially, then the fibers 82, 86 of the inner layer 42 or the outer layer 46 extend axially, circumferentially, or at an angle relative to axially or circumferentially. Each fiber is elongated, that is, extends in one direction much longer than in any other direction. The direction of a collection of fibers, such as the fibers 82, 84, 86 of one of the layers 42, 44, 46, is an aggregated direction of the individual fibers 82, 84, 86, specifically a direction in which a majority of the fibers 82, 84, 86 are oriented.

A density of the fibers 82, 84, 86 may vary between different locations in the layers 42, 44, 46. For example, as shown in FIG. 7, the fibers 82 may be denser at the outer diameter of the flange portion 74 of the outer layer 46 than at the inner diameter of the flange portion 74 or in the tubular portion 72. The density of the fibers 82, 84, 86 is the number of fibers per unit volume.

With reference to FIGS. 4-8, a liner 88 may line the bore 62. The liner 88 may be the matrix material of the fiber-reinforced material forming the inner layer 42; that is, the fibers 86 of the fiber-reinforced material of the inner layer 42 may be spaced from the bore 62 by the liner 88. Alternatively, the liner 88 may be a different material than the matrix material of the inner layer 42.

Figure 3:
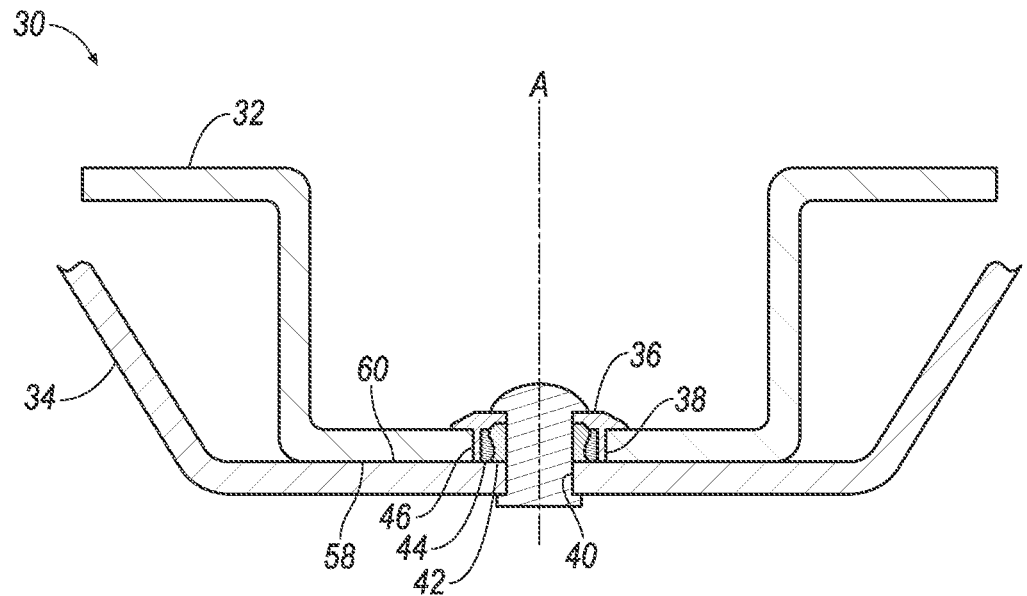
FIG. 3 is a cross-sectional view of the first component, second component, the insert, and the fastener along line 3-3 in FIG. 2.

With reference to FIGS. 2 and 3, the joined structure 30 includes the fastener 48. The fastener 48 may be positioned through the bore 62 of the inner layer 42 and the hole 40 of the second component 34. The fastener 48 joins the first component 32 and the second component 34, that is, holds the first component 32 and the second component 34 together. Because of the insert 36, the fastener 48 when installed does not touch any of the fibers 56 of the fiber-reinforced material of the first component 32. The fastener 48 may be a rivet, as shown in FIGS. 2 and 3. When installed to the first component 32 and the second component 34, the fastener 48 may include heads 90 at both ends that pinch the inner layer 42 and the outer layer 44 together. Alternatively, the fastener 48 may be of any suitable type for holding the first component 32 and the second component 34 together, e.g., a threaded fastener, a pin, a clip, etc.

If the first component 32 and the second component 34 are subject to forces pulling in different directions, the fastener 48 may prevent the components 32, 34 from separating. The forces will push the fastener 48 against one side of the bore 62 of the insert 36. If the forces are sufficiently large, then the insert 36 may deform or break. The different direction of the fibers of the middle layer 44 than the inner or outer layer 42, 46 may allow the middle layer 44 to compress and thereby absorb energy without the insert 36 breaking.

With reference to FIG. 7, a first embodiment of the insert 36 may include the fibers 82 of the outer layer 46 extending circumferentially relative to the axis A, the fibers 84 of the middle layer 44 extending axially relative to the axis A, and the fibers 86 of the inner layer 42 extending along a direction diagonal between circumferential and axial relative to the axis A. In other words, the fibers 82 of the outer layer 46 extend in a circumferential direction, that is, the axial dimension z and the radial dimension r are constant with respect to the circumferential dimension $\theta$ for each fiber. The fibers 84 of the middle layer 44 extend parallel to the axis A, that is, the radial dimension r and the circumferential dimension $\theta$ are constant with respect to the axial dimension z. The fibers 86 of the inner layer 42 extend along a spiral of constant radius about the axis A, that is, the radial dimension r is constant and the axial dimension is a linear function of the circumferential dimension $\theta$, i.e., $z=k\theta$, in which k is constant. The inner layer 42 may include a first set of fibers 86a diagonal between the circumferential and axial dimensions and a second set of fibers 86b oppositely diagonal between the circumferential and axial dimensions. Thus, for the first set of fibers 86a, r is constant and $z=k\theta$, and for the second set of fibers 86b, r is constant and $z=-j\theta$, in which j and k are positive constants.

With reference to FIG. 8, a second embodiment of the insert 36 may include the fibers 82 of the outer layer 46 extending circumferentially relative to the axis A, the fibers 84 of the middle layer 44 extending radially relative to the axis A, and the fibers 86 of the inner layer 42 extending circumferentially relative to the axis A. In other words, the fibers 82 of the outer layer 46 and the inner layer 42 extend in a circumferential direction, that is, the axial dimension z and the radial dimension r are constant with respect to the circumferential dimension $\theta$ for each fiber. The fibers 84 of the middle layer 44 extend orthogonal to the axis A, that is, the axial dimension z and the circumferential dimension $\theta$ are constant with respect to the radial dimension r.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A joined structure comprising:
   a first component formed of a fiber-reinforced material and having a hole defining an axis;
   a second component adjacent the first component and having a hole aligned with the hole of the first component; and
   an insert positioned in the hole of the first component, the insert including an inner layer having a tubular shape about the axis, a middle layer concentrically adjacent to the inner layer about the axis, and an outer layer concentrically adjacent to the middle layer about the axis;
   the layers being formed of fiber-reinforced materials; and
   one of a boundary between the inner and middle layers and a boundary between the middle and outer layers having a nonlinear profile in a direction parallel to the axis.

2. The joined structure of claim 1, wherein the inner layer has a bore; further comprising a liner lining the bore.

3. The joined structure of claim 1, wherein the fiber-reinforced material of the first component has fibers, and at least some of the fibers are exposed in the hole of the first component.

4. The joined structure of claim 1, wherein the fiber-reinforced materials of the layers each have fibers, and the fibers of the fiber-reinforced material of the middle layer extend in a direction relative to the axis different than the fibers of the fiber-reinforced material of one of the inner layer and the outer layer.

5. The joined structure of claim 4, wherein the fibers of the outer layer extend circumferentially relative to the axis.

6. The joined structure of claim 5, wherein the fibers of the middle layer extend one of radially and axially relative to the axis.

7. The joined structure of claim 6, wherein the fibers of the inner layer extend along a direction diagonal between circumferential and axial relative to the axis.

8. The joined structure of claim 1, wherein the outer layer has a tubular portion concentrically adjacent to the middle layer about the axis and a flange portion extending radially outward relative to the axis from the tubular portion.

9. The joined structure of claim 8, wherein the inner layer has a first end, and the flange portion extends radially inward relative to the axis from the tubular portion adjacent the first end of the inner layer.

10. The joined structure of claim 9, wherein a boundary between the flange portion of the outer layer and the first end of the inner layer has a nonlinear profile in a radial dimension relative to the axis.

11. An insert comprising:
    an inner layer having a tubular shape defining an axis;
    a middle layer concentrically adjacent to the inner layer about the axis; and
    an outer layer concentrically adjacent to the middle layer about the axis;
    the layers being formed of fiber-reinforced materials; and
    one of a boundary between the inner and middle layers and a boundary between the middle and outer layers having a nonlinear profile in a direction parallel to the axis.

12. The insert of claim 11, wherein the inner layer has a bore; further comprising a liner lining the bore.

13. The insert of claim 11, wherein the fiber-reinforced materials of the layers each have fibers, and the fibers of the fiber-reinforced material of the middle layer extend in a direction relative to the axis different than the fibers of the fiber-reinforced material of one of the inner layer and the outer layer.

14. The insert of claim 13, wherein the fibers of the outer layer extend circumferentially relative to the axis.

15. The insert of claim 14, wherein the fibers of the middle layer extend one of radially and axially relative to the axis.

16. The insert of claim 15, wherein the fibers of the inner layer extend along a direction diagonal between circumferential and axial relative to the axis.

17. The insert of claim 11, wherein the outer layer has a tubular portion concentrically adjacent to the middle layer about the axis and a flange portion extending radially outward relative to the axis from the tubular portion.

18. The insert of claim 17, wherein the inner layer has a first end, and the flange portion extends radially inward relative to the axis from the tubular portion adjacent the first end of the inner layer.

19. The insert of claim 18, wherein a boundary between the flange portion of the outer layer and the first end of the inner layer has a nonlinear profile in a radial dimension relative to the axis.

20. An insert comprising:
    an inner layer having a tubular shape defining an axis and extending from a first end;
    a middle layer concentrically adjacent to the inner layer about the axis and extending from the first end; and
    an outer layer having a tubular portion concentrically adjacent to the middle layer about the axis and a flange portion extending radially inward and outward relative to the axis from the tubular portion, the flange portion adjacent the first end of the inner layer;
    the layers being formed of fiber-reinforced materials.

* * * * *